US011240008B2

(12) United States Patent
Pan

(10) Patent No.: US 11,240,008 B2
(45) Date of Patent: Feb. 1, 2022

(54) KEY MANAGEMENT METHOD, SECURITY CHIP, SERVICE SERVER AND INFORMATION SYSTEM

(71) Applicant: ADVANCED NEW TECHNOLOGIES CO., LTD., Grand Cayman (KY)

(72) Inventor: Wuqiong Pan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/246,212

(22) Filed: Apr. 30, 2021

(65) Prior Publication Data

US 2021/0258148 A1 Aug. 19, 2021

Related U.S. Application Data

(63) Continuation of application No. PCT/CN2020/074893, filed on Feb. 12, 2020.

(30) Foreign Application Priority Data

Mar. 22, 2019 (CN) ......................... 201910224105.8

(51) Int. Cl.
*H04L 9/08* (2006.01)
*H04L 9/32* (2006.01)

(52) U.S. Cl.
CPC .............. *H04L 9/083* (2013.01); *H04L 9/085* (2013.01); *H04L 9/0825* (2013.01); *H04L 9/3234* (2013.01); *H04L 9/3263* (2013.01)

(58) Field of Classification Search
CPC ....... H04L 9/083; H04L 9/085; H04L 9/3263; H04L 9/3234; H04L 9/0825
See application file for complete search history.

(56) References Cited

U.S. PATENT DOCUMENTS 7,890,771 B2 2/2011 England et al.
8,103,883 B2 1/2012 Smith
(Continued)

FOREIGN PATENT DOCUMENTS

CN 101243469 A 8/2008
CN 101897211 A 11/2010
(Continued)

OTHER PUBLICATIONS

Search Report for Taiwanese Application No. 108134197 dated Dec. 3, 2020.

(Continued)

*Primary Examiner* — J. Brant Murphy

(57) ABSTRACT

A key management method includes: sending, by a security chip of a computer device, a request for obtaining a service key to a key management service; receiving, by the security chip, a service key ciphertext from the key management service, wherein the service key ciphertext is obtained by encrypting the service key by the key management service based on a migration key of the security chip; decrypting, by the security chip, the service key ciphertext based on the migration key to obtain the service key; storing, by the security chip, the service key in the security chip; and providing, by the security chip, the service key to an application program of the computer device when the application program needs to encrypt data based on the service key.

20 Claims, 2 Drawing Sheets

(56) References Cited

U.S. PATENT DOCUMENTS

| | | | | |
|---|---|---|---|---|
| 8,522,018 | B2 | 8/2013 | Molina et al. | |
| 8,600,060 | B2 | 12/2013 | Priestley et al. | |
| 8,644,502 | B2 | 2/2014 | Orsini et al. | |
| 8,838,977 | B2 | 9/2014 | Winograd et al. | |
| 9,137,739 | B2 | 9/2015 | Raleigh | |
| 9,158,957 | B2 | 10/2015 | Boshra et al. | |
| 9,209,979 | B2 | 12/2015 | Spiers et al. | |
| 9,226,145 | B1 | 12/2015 | Loman et al. | |
| 9,356,940 | B2 | 8/2016 | Hanna, Jr. et al. | |
| 9,652,631 | B2 | 5/2017 | Novak et al. | |
| 9,729,517 | B2 | 8/2017 | Brandwine et al. | |
| 10,097,350 | B2 | 10/2018 | Smith et al. | |
| 10,211,985 | B1 * | 2/2019 | Brandwine | G06F 21/575 |
| 10,243,739 | B1 * | 3/2019 | Brandwine | H04L 9/0643 |
| 10,303,899 | B2 | 5/2019 | Durham et al. | |
| 2002/0064282 | A1 | 5/2002 | Loukianov et al. | |
| 2003/0105965 | A1 | 6/2003 | Challener | |
| 2007/0094719 | A1 * | 4/2007 | Scarlata | G06F 21/552<br>726/9 |
| 2008/0126802 | A1 * | 5/2008 | Li | H04L 9/3234<br>713/168 |
| 2009/0089582 | A1 * | 4/2009 | Brutch | G06F 21/57<br>713/171 |
| 2009/0154709 | A1 * | 6/2009 | Ellison | H04L 9/083<br>380/282 |
| 2009/0199279 | A1 * | 8/2009 | Lange | H04L 9/3247<br>726/6 |
| 2010/0228968 | A1 | 9/2010 | Wason et al. | |
| 2012/0275596 | A1 | 11/2012 | Ureche et al. | |
| 2015/0019443 | A1 | 1/2015 | Sheets et al. | |
| 2017/0006001 | A1 | 1/2017 | Narayan et al. | |
| 2017/0111333 | A1 * | 4/2017 | Smith | H04L 9/3234 |
| 2017/0302459 | A1 | 10/2017 | Fenner et al. | |
| 2018/0062835 | A1 | 3/2018 | Hamel et al. | |
| 2018/0287792 | A1 | 10/2018 | Fu | |
| 2018/0375655 | A1 * | 12/2018 | Thom | H04L 63/0435 |
| 2019/0158606 | A1 | 5/2019 | Guim Bernat et al. | |
| 2021/0004483 | A1 | 1/2021 | Durham et al. | |

FOREIGN PATENT DOCUMENTS

| | | | |
|---|---|---|---|
| CN | 101515319 | B | 1/2011 |
| CN | 102355657 | A | 2/2012 |
| CN | 101355422 | B | 1/2014 |
| CN | 105556553 | A | 5/2016 |
| CN | 105743873 | A | 7/2016 |
| CN | 106789000 | A | 5/2017 |
| CN | 107766724 | A | 3/2018 |
| CN | 109075976 | A | 12/2018 |
| CN | 109450951 | A | 3/2019 |
| CN | 109921902 | A | 6/2019 |
| TW | 201837776 | A | 10/2018 |

OTHER PUBLICATIONS

Written Opinion and International Search Report for PCT Application No. PCT/CN2020/074893 dated Apr. 30, 2020.

First Search for Chinese Application No. 201910224105.8 dated Apr. 10, 2020.

Supplementary Search for Chinese Application No. 201910224105.8 dated Jun. 15, 2020.

Supplementary Search for Chinese Application No. 201910224105.8 dated Sep. 4, 2020.

Wei et al., "Analyzing Trusted Computing Protocol Based on the Strand Spaces Model," Chinese Journal of Computers, vol. 38 No. 4, Apr. 30, 2015.

"Cryptography Test Criteria for Security IC," Commercial Cryptographic Testing Center of the State Cryptography Administration, Nov. 30, 2011.

Niu et al., "5.4.5 Key replacement and key revocation," Introduction to Information Security, Aug. 31, 2016.

Extended European Search Report for European Application No. 20 778 745.8 dated Nov. 19, 2021.

International Preliminary Report on Patentability Chapter I for PCT Application No. PCT/CN2020/074893 dated Oct. 7, 2021.

* cited by examiner

KEY MANAGEMENT METHOD, SECURITY CHIP, SERVICE SERVER AND INFORMATION SYSTEM

CROSS REFERENCE TO RELATED APPLICATIONS

This application is a continuation application of International Application No. PCT/CN2020/074893, filed on Feb. 12, 2020, which claims priority to and benefits of Chinese Patent Application No. 201910224105.8 filed on Mar. 22, 2019. The content of the above-referenced applications is incorporated herein by reference in their entirety.

TECHNICAL FIELD

Embodiments of this specification relate to the field of Internet technologies, and in particular, to a key management method, a security/security chip, a service server, and an information system.

BACKGROUND

An information system mostly uses cryptographic technologies to ensure data security (such as database encryption, communication encryption, and identity authentication). To ensure key security, the information system generally uses a hardware security module (HSM) or a key management service (KMS) to protect keys.

However, a large-scale information system usually has tens of thousands of service servers, causing many problems in key management. For example, the KMS has a heavy load and is prone to crashes, causing breakdown of the entire key management, or the key is easily stolen by a hacker, which severely affects information security.

SUMMARY

Embodiments of this specification provide a key management method, a security chip, a computer device (e.g., service server), and an information system, which resolves the technical problem that a KMS has a heavy load or a service key is easily stolen by a hacker in an information system in existing technologies, and achieves the technical effects of reducing the load of the KMS and effectively preventing the service key from being easily stolen by a hacker.

According to a first aspect, this specification provides the following technical solutions according to various embodiments of this specification.

A key management method is provided, applicable to a security chip, where the security chip is disposed in a computer device (e.g., service server) in an information system, and the information system further includes a key management service, the method including: sending, by the security chip, a request to the key management service, where the request is used for obtaining a service key from the key management service; receiving, by the security chip, a service key ciphertext sent by the key management service, where the service key ciphertext is obtained by encrypting the service key by the key management service based on a migration key; decrypting, by the security chip, the service key ciphertext based on the migration key to obtain the service key; storing, by the security chip, the service key in the security chip; and providing, by the security chip, the service key to an application program on the computer device when the application program needs to encrypt service data based on the service key.

In some embodiments, before the sending, by the security chip, a request to the key management service, the method further includes: sending, by the security chip, a migration certificate to the key management service for authentication by the key management service, where the migration certificate is stored in the security chip and is used for identity authentication of the security chip; and sending, by the security chip, the request to the key management service after the authentication of the migration certificate succeeds.

In some embodiments, the storing, by the security chip, the service key in the security chip includes: encrypting, by the security chip, the service key based on a storage key, and storing the encrypted service key in the security chip, where storage keys corresponding to different security chips are different; or storing, by the security chip, the service key in a specific security space, where the specific security space is in the security chip.

In some embodiments, the providing, by the security chip, the service key to an application program includes: receiving, by the security chip, to-be-encrypted service data sent by the application program; and encrypting, by the security chip, the to-be-encrypted service data based on the service key, and sending the encrypted service data to the application program.

In some embodiments, the providing, by the security chip, the service key to an application program includes: sending, by the security chip, the service key to the application program for the application program to encrypt to-be-encrypted service data based on the service key.

In some embodiments, after the security chip securely stores the service key, the method further includes: performing, by the security chip, invalidation on the service key after a preset time period; and resending, by the security chip, a request to the key management service to obtain a new service key from the key management service.

According to a second aspect, this specification provides the following technical solutions according to various embodiments of this specification.

A security chip is provided, applicable to a computer device in an information system, where the information system further includes a key management service, the security chip including: a first sending unit, configured to send a request to the key management service, where the request is used for obtaining a service key from the key management service; a first receiving unit, configured to receive a service key ciphertext sent by the key management service, where the service key ciphertext is obtained by encrypting the service key by the key management service based on a migration key; a decryption unit, configured to decrypt the service key ciphertext based on a second migration key to obtain the service key, where the second migration key is stored in the security chip and corresponds to the first migration key; a storage unit, configured to store the service key in the security chip; and a providing unit, configured to provide the service key to an application program on the computer device when the application program needs to encrypt service data based on the service key.

In some embodiments, the security chip further includes: a second sending unit, configured to send a migration certificate to the key management service for authentication by the key management service before the request is sent to the key management service, where the migration certificate is stored in the security chip and is used for identity authentication of the security chip, where the first sending unit sends the request to the key management service after the authentication of the migration certificate succeeds.

In some embodiments, the storage unit is configured to encrypt the service key based on a storage key, and store the encrypted service key, where storage keys corresponding to different security chips are different; or store the service key in a specific security space, where the specific security space is in the security chip.

In some embodiments, the providing unit is configured to receive to-be-encrypted service data sent by the application program; encrypt the to-be-encrypted service data based on the service key; and send the encrypted service data to the application program.

In some embodiments, the providing unit is configured to send the service key to the application program for the application program to encrypt to-be-encrypted service data based on the service key, where the application program is installed on the computer device corresponding to the security chip.

In some embodiments, the security chip further includes: an invalidation unit, configured to perform invalidation on the service key after a preset time period; and an updating unit, configured to resend a request to the key management service to obtain a new service key from the key management service after the invalidation is performed on the service key.

According to a third aspect, this specification provides the following technical solutions according to various embodiments of this specification. A service server or any other computer device is provided with the security chip disclosed herein.

According to a fourth aspect, this specification provides the following technical solutions according to various embodiments of this specification. An information system is provided, including: a key management service; and a plurality of computer devices, provided with a security chip in each computer device.

According to a fifth aspect, this specification provides the following technical solutions according to various embodiments of this specification. A computer-readable storage medium is provided, storing a computer program, where any implementation of the first aspect may be performed when the program is executed by a processor.

According to a sixth aspect, a key management method is provided. The key management method includes: sending, by a security chip of a computer device, a request for obtaining a service key to a key management service; receiving, by the security chip, a service key ciphertext from the key management service, wherein the service key ciphertext is obtained by encrypting the service key by the key management service based on a migration key of the security chip; decrypting, by the security chip, the service key ciphertext based on the migration key to obtain the service key; storing, by the security chip, the service key in the security chip; and providing, by the security chip, the service key to an application program of the computer device when the application program needs to encrypt data based on the service key.

In some embodiments, before the sending, by the security chip, a request for obtaining a service key to the key management service, the method further comprises: sending, by the security chip, a migration certificate to the key management service, wherein the migration certificate is stored in the security chip and is configured for identity authentication of the security chip; and authenticating, by the key management service, the migration certificate.

In some embodiments, the storing, by the security chip, the service key in the security chip includes: encrypting, by the security chip, the service key with a storage key to generated an encrypted service key, and storing the encrypted service key in the security chip, wherein storage keys corresponding to different security chips are different.

In some embodiments, the storing, by the security chip, the service key in the security chip includes: storing, by the security chip, the service key in a secured space of the security chip.

In some embodiments, the migration certificate includes the migration key of the security chip. The security chip provides the migration key to the key management service when the security chip sends the migration certificate to the key management service.

In some embodiments, the providing, by the security chip, the service key to an application program of the computer device includes: receiving, by the security chip, service data sent by the application program; and encrypting, by the security chip, the service data with the service key to generate encrypted service data, and sending the encrypted service data to the application program.

In some embodiments, the providing, by the security chip, the service key to an application program of the computer device includes: sending, by the security chip, the service key to the application program for the application program to encrypt service data with the service key.

In some embodiments, the method further includes: invalidating, by the security chip, the service key after a preset time period; and resending, by the security chip, a request for obtaining a new service key to the key management service to obtain the new service key from the key management service.

According to a seventh aspect, a security chip is provided. The security chip is disposed in a computer device, e.g., a server. The computer device stores instructions that, when executed by the security chip, cause the security chip to perform operations including: sending a request for obtaining a service key to a key management service; receiving a service key ciphertext from the key management service, wherein the service key ciphertext is obtained by encrypting the service key by the key management service based on a migration key of the security chip; decrypting the service key ciphertext based on the migration key to obtain the service key; storing the service key in the security chip; and providing the service key to an application program of the computer device when the application program needs to encrypt data based on the service key.

According to an eighth aspect, a non-transitory computer-readable storage medium is provided. The non-transitory computer-readable storage medium stores instructions executable by a security chip of a computer device to cause the security chip to perform operations including: sending a request for obtaining a service key to a key management service; receiving a service key ciphertext from the key management service, wherein the service key ciphertext is obtained by encrypting the service key by the key management service based on a migration key of the security chip; decrypting the service key ciphertext based on the migration key to obtain the service key; storing the service key in the security chip; and providing the service key to an application program of the computer device when the application program needs to encrypt data based on the service key.

One or more technical solutions provided in the embodiments of this specification have at least the following technical effects or advantages. The embodiments of this specification disclose a key management method, applicable to a security chip. Because a security chip is disposed in each computer device (e.g., service server), and a key is transmitted in a ciphertext, the key is stored in the security chip, which can effectively prevent a hacker from attacking an internal memory to steal a service key, thereby improving the security of the key. In addition, after a service key is requested once from a key management service, the service key may be temporarily stored in the security chip. If the service key needs to be used in this period of time, it is not necessary to initiate a request to the key management service again, and the service key may be directly obtained from the security chip in the computer device, thereby reducing a load of the key management service, preventing the key management service from crashing, and improving the reliability of an information system. The embodiments of this specification are dedicated to achieving a balance between the security of the key and the load of the key management service, and achieve the technical effects of reducing the load of the key management service and preventing the service key from being stolen by a hacker.

BRIEF DESCRIPTION OF THE DRAWINGS

To describe the technical solutions in embodiments of this specification more clearly, the following briefly describes accompanying drawings required for describing the embodiments. Apparently, the accompanying drawings in the following description show some embodiments of this specification, and a person of ordinary skill in the art may still derive other drawings from these accompanying drawings without creative efforts.

DETAILED DESCRIPTION OF EMBODIMENTS

Figure 1:
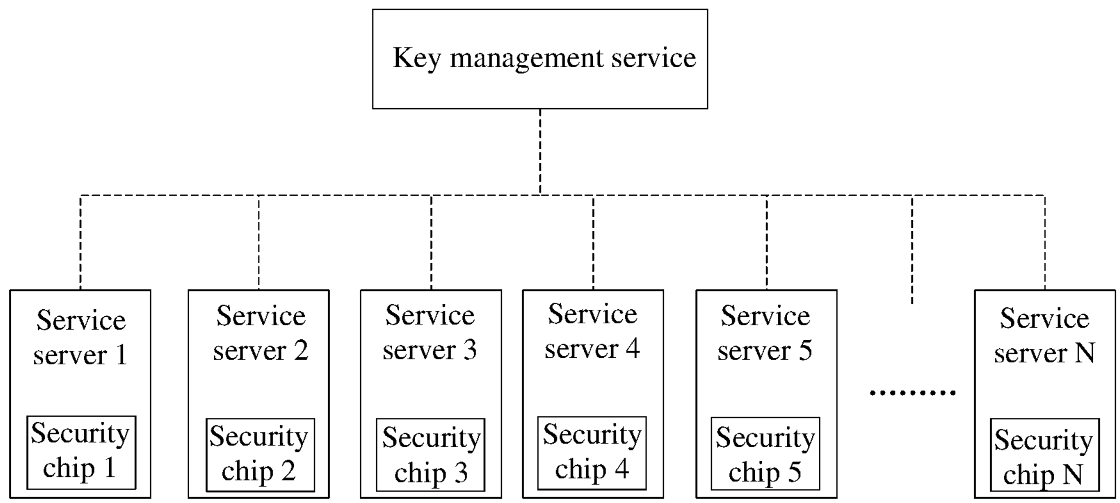
FIG. 1 is an architectural diagram of an information system, according to an embodiment of this specification.

Before this method is formally described, the existing technologies are first described as follows.

In the existing technologies, a key is managed mainly by using the following two methods:

In the first method, a service key is stored in a KMS, and the service key is always used under the protection of the KMS. That is, every time the key is needed, a service server needs to send a request to the KMS. This method is feasible for a small-scale information system. However, for a large-scale information system (having a large number of service servers), all cryptographic operations send requests to the KMS to cause severe single-point dependence, and as a result the KMS may crash that affects system stability. In particular, the data volume involved in operations such as database encryption and communication encryption is very large. Some high-security information systems use the method of full network encryption, and have an even larger data volume. As a result, it is impractical to send all data to the KMS.

In the second method, a service key is stored in a KMS. When the key is needed, a service server retrieves the key, and subsequent operations using the key are all performed in the service server. With this method, the KMS is only required in the process of obtaining a key but is not required in the process of using a key when there is a large quantity of data, thereby avoiding the stability and performance problems of the first method. However, in this method, the key is held in the service server. If the service server is hacked by a hacker (for example, an internal memory of the service server is hacked), the hacker can obtain the service key. This problem does not exist in the first method. Because the first method affects the stability and performance of the system, most large-scale information systems use the second method at present.

In view of this, the key management methods in the existing technologies generally have the technical problems that the KMS has a heavy load or a service key is easily stolen by a hacker.

Embodiments of this specification provide a key management method, a security chip, a service server, and an information system, which resolves the technical problem that a KMS has a heavy load or a service key is easily stolen by a hacker in an information system in existing technologies, and achieves the technical effects of reducing the load of the KMS and effectively preventing the service key from being easily stolen by a hacker.

To resolve the foregoing technical problem, the technical solutions in the embodiments of this specification have the following general idea:

A key management method is provided, applicable to a security chip, where the security chip is disposed in a computer device (e.g., service server) in an information system, and the information system further includes a key management service, the method including: sending, by the security chip, a request to the key management service, where the request is used for obtaining a service key from the key management service; receiving, by the security chip, a service key ciphertext sent by the key management service, where the service key ciphertext is obtained by encrypting the service key by the key management service based on a migration key; decrypting, by the security chip, the service key ciphertext based on the migration key to obtain the service key; storing, by the security chip, the service key in the security chip; and providing, by the security chip, the service key to an application program on the computer device when the application program needs to encrypt service data based on the service key. The computer device disclosed herein may include other electronic devices, such as desktops, laptops, tablets, smart phones, handheld devices, etc.

To make the foregoing technical solution better understood, the following describes the foregoing technical solution in detail with reference to the accompanying drawings of the specification and specific implementations. A service server or server is used in the specification and drawings as an example. A person having ordinary skills in the field should appreciate that the security chip can be disposed in other computer devices and can perform the functionalities as described in this specification.

EMBODIMENT 1

This embodiment provides a key management method, applicable to an information system (especially a large-scale information system, having a large quantity of service servers, for example, having tens of thousands of service servers). As shown in FIG. 1, in some embodiments, the information system includes a key management service/server and a plurality of service servers (such as a service server 1, a service server 2, a service server 3, . . . ).

The key management service is a system that can provide complete key management and cryptographic calculation, usually includes a plurality of HSMs, and provides functions such as high availability and key backup. The key management service in this specification is used for providing a service key to each service server, and the service key is used for the service server to encrypt service data, thereby ensuring data security.

The HSM is usually a combination of software and hardware with a clear physical boundary (a solid shell), which can ensure the security of the key in a full life cycle and provide the functions of key management and cryptographic calculation to the outside. A typical HSM includes a security card, a security machine, or the like.

Compared with the existing technologies, in this embodiment, a security chip is disposed in each service server (for example, a security chip 1 is disposed in a service server 1, a security chip 2 is disposed in a service server 2, a security chip 3 is disposed in a service server 3, . . . ), and each security chip is used for managing a service key for the service server where the security chip is located.

Figure 2:
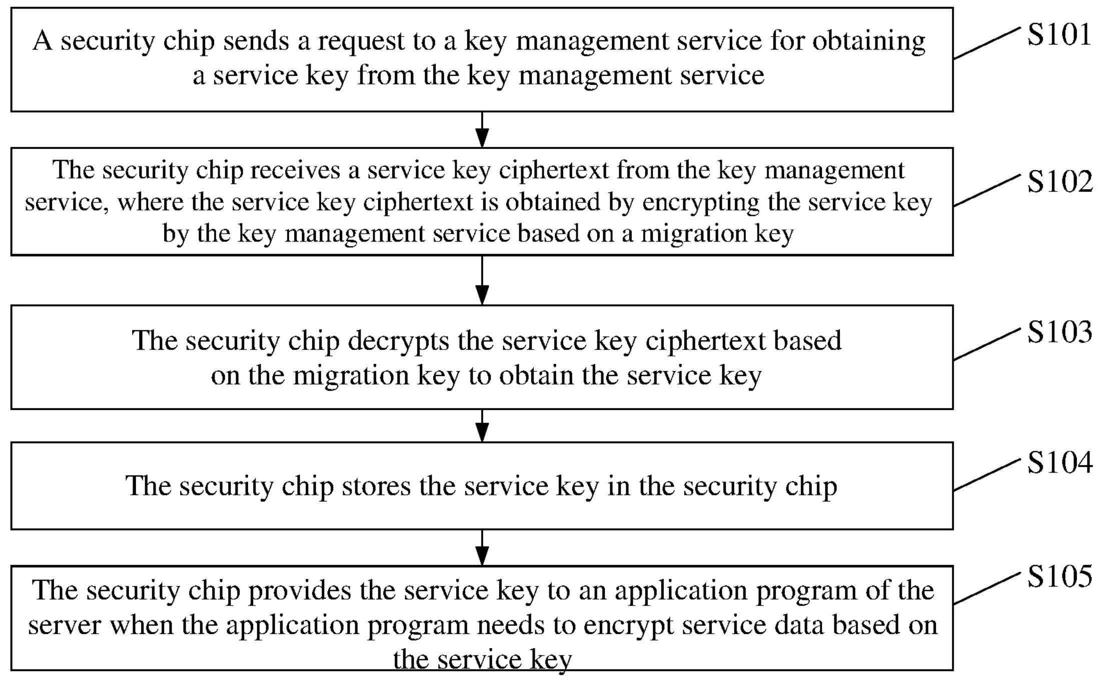
FIG. 2 is a flowchart of a key management method, according to an embodiment of this specification.

This method is applicable to a security chip (that is, applicable to a security chip in each service server in an information system). As shown in FIG. 2, the method includes the following steps.

Step S101: A security chip sends a request to a key management service, where the request is used for obtaining a service key from the key management service.

In an embodiment, before step S101, the method further includes:

sending, by the security chip, a migration certificate to the key management service for authentication by the key management service, where the migration certificate is stored in the security chip; and performing step S101 after the authentication of the migration certificate succeeds. The migration certificate is stored in the security chip and is used for authenticating that the security chip has a valid identity.

In some embodiments, before step S101, the security chip needs to be initialized. During the initialization, the security chip needs to send the migration certificate of the security chip to the key management service, and the key management service authenticates the migration certificate. One migration certificate is stored in each security chip. The migration certificate may be flashed into the security chip by a chip manufacturer before the security chip leaves the factory or may be flashed into the security chip by an operator corresponding to the information system after the operator purchases the security chip from the manufacturer. The migration certificate is used for authenticating the validity of the identity of the security chip.

If the authentication of the migration certificate succeeds, the key management service feeds back information that the authentication succeeds to the security chip. Further, step S101 may be performed. That is, the security chip sends the request to the key management service to obtain the service key.

Step S102: The security chip receives a service key ciphertext sent by the key management service, where the service key ciphertext is obtained by encrypting the service key by the key management service based on a migration key.

According to some embodiments, after receiving the request sent by the security chip, the key management service extracts a service key (for example, randomly extracts a service key from a service key store, extracts a service key from a service key store based on a preset rule, or generates a service key by using the HSM). In addition, a first migration key is stored in the migration certificate previously sent by the security chip, and the first migration key may be a public key in an asymmetric encryption mode. Further, the key management service may encrypt the extracted service key based on the first migration key, generate a service key ciphertext, and send the service key ciphertext to the security chip. Correspondingly, the security chip receives the service key ciphertext sent by the key management service.

Step S103: The security chip decrypts the service key ciphertext based on the migration key to obtain the service key.

According to some embodiments, a second migration key corresponding to the first migration key is further stored in the security chip, and the second migration key is a private key corresponding to the public key. The security chip may decrypt the service key ciphertext based on the second migration key to obtain the service key (that is, a plaintext of the service key).

In some embodiments, migration keys (that is, the first migration key and the second migration key) corresponding to security chips are different, thereby improving the security of the service key during transmission and preventing the encrypted service key from being intercepted and decrypted by other security chips.

Step S104: The security chip stores the service key in the security chip.

In an embodiment, step S104 includes the following two implementations:

Implementation 1: The security chip encrypts the service key based on a storage key, and stores the encrypted service key locally in the security chip, where storage keys on security chips are different. The storage key is different from the migration key, and is used for encrypted storage of the service key.

In some embodiments, a storage key is also stored in the security chip. The security chip may encrypt (the plaintext of) the service key based on the storage key, and store the encrypted service key locally in the security chip.

In some embodiments, storage keys on security chips are different, thereby improving the security of data storage, and preventing the encrypted service key from being decrypted by other security chips.

Implementation 2: The service key is stored in a specific security space, where the specific security space is in the security chip.

In some embodiments, a specific security space is further provided in the security chip. The specific security space uses software or hardware encryption to make data stored in the specific security space absolutely secure.

For each security chip, any one of the foregoing two implementations may be used to securely store the service key.

Compared with the existing technologies, in this embodiment, because a security chip is disposed in each service server, and a service key is transmitted in a ciphertext, the service key is stored in the security chip (instead of being stored in a hard disk or an internal memory of the service server), which can effectively reduce the risk that a hacker attacks the internal memory to steal the service key, thereby improving the security of the key.

Step S105: The security chip provides the service key to an application program on the service server when the application program needs to encrypt service data based on the service key.

In some embodiments, if the performance of the security chip is relatively high, the encryption process of the service data may be completed locally by the security chip.

When the application program needs to use the service key, the security chip may receive to-be-encrypted service data sent by the application program. The application program is installed on the service server corresponding to the security chip (that is, the application program and the security chip are located on the same service server, and each security chip only provides services to the application program on the service server where the security chip is located). The security chip encrypts the to-be-encrypted service data based on the service key, and sends the encrypted service data to the application program.

For example, when an application program 1 on a service server 1 needs to use the service key, the application program 1 may send the to-be-encrypted service data to a security chip 1, and the security chip 1 encrypts the service data based on the service key and returns the encrypted service data to the application program 1.

In some embodiments, if the performance of the security chip is relatively low, the encryption process of the service data may be completed by the application program.

When the application program needs to use the service key, the security chip may send the service key to the application program for the application program to encrypt to-be-encrypted service data based on the service key. The application program is installed on the service server corresponding to the security chip (that is, the application program and the security chip are located on the same service server, and each security chip only provides services to the application program on the service server where the security chip is located).

For example, when an application program 2 on a service server 2 needs to use the service key, a security chip 2 may send the service key to the application program 2, and the application program 2 encrypts the to-be-encrypted service data.

Each time after the application program uses the service key, the service key is completely deleted, and a service key is reobtained from the security chip when the service key needs to be used a next time. The objective is to prevent the service key from staying in an insecure environment for a long time (that is, in an environment other than the security chip) and to reduce the risk that the service key is stolen by a hacker.

In an embodiment, after step S104, the method further includes: performing, by the security chip, invalidation on the service key after a preset time period; and resending, by the security chip, a request to the key management service to obtain a new service key from the key management service. The preset time period may be flexibly set according to an actual requirement (such as 10 minutes, half an hour, one hour, 12 hours, or 24 hours). The specific length of the preset time period is not limited in this embodiment. The invalidation time may be set during the production or initialization of the chip, or may be remotely set by the key management service.

That is, the security chip also has the function of periodic invalidation, which is used for periodically performing invalidation on the service key.

In some embodiments, each service key is only temporarily stored in the security chip. An invalidation time (that is, a preset time period) may be set for the service key, a timing function may be implemented in the security chip. After the invalidation time ends, the invalidation (for example, deletion) is performed on the service key stored in the security chip.

However, a conventional security chip does not have this function, and the service key can only be stored in the security chip for a long time. Although an attacker may not be able to steal the service key after hacking into upper-level software (for example, OS), the attacker can maliciously call the service key in the security chip to perform cryptographic operations.

In addition, if there is no function of periodic invalidation, in a cloud environment, because an application may migrate between different servers, a security chip on each server keeps the service key of the application. As a result, the service key of the application is more likely to be maliciously called. The cloud environment actually enlarges the range of keeping the service key. Therefore, the risk caused by the foregoing attack becomes severer. An invalidation time is set to change an attack time window from a long time to an invalidation period (for example, 10 minutes), and the security risks are significantly reduced.

Moreover, through the management of the invalidation time, the key management service has a very strong capacity to control the service key. If the key management service wants to keep the service server from having a capacity of performing cryptographic operations locally (returns to a conventional key management service mode), the key management service only needs to stop supporting key migration operations. After an invalidation period (for example, 10 minutes), service keys in all security chips become invalid. The service server can only use the service key in a conventional manner.

It should be noted herein that, an application on the service server has no permission to set the invalidation time, and the invalidation time can only be set by the security chip. This is because the environment of the application on the service server is relatively complex, and the application is easily infected by viruses, leading to compromised security.

Compared with the existing technologies, in this embodiment, after a service key is requested once from a key management service and before the service key becomes invalid, the service key may be temporarily stored in the security chip. If the service key needs to be used in this period of time, it is not necessary to initiate a request to the key management service again, and the service key may be directly obtained from the security chip in the service server, thereby reducing a load of the key management service, preventing the key management service from crashing, and improving the reliability of an information system.

In some embodiments, the security chip performs invalidation on the service key, and the security chip may repeat the foregoing steps S101 to S104 to obtain a new service key from the key management service. In this case, the service key may be updated periodically.

The technical solutions in the embodiments of this specification have at least the following technical effects or advantages:

The embodiments of this specification disclose a key management method, applicable to a security chip, where the security chip is disposed in a service server in an information system, and the information system further includes a key management service, the method including: sending, by the security chip, a request to the key management service, where the request is used for obtaining a service key from the key management service; receiving, by the security chip, a service key ciphertext sent by the key management service, where the service key ciphertext is obtained by encrypting the service key by the key management service based on a migration key; decrypting, by the security chip, the service key ciphertext based on the migration key to obtain the service key; storing, by the security chip, the service key in the security chip; and providing, by the security chip, the service key to an application program on the service server when the application program needs to encrypt service data based on the service key. Because a security chip is disposed in each service server, and a key is transmitted in a ciphertext, the key is stored in the security chip, which can effectively prevent a hacker from attacking an internal memory to steal a service key, thereby improving the security of the key. In addition, after a service key is requested once from a key management service, the service key may be temporarily stored in the security chip. If the service key needs to be used in this period of time, it is not necessary to initiate a request to the key management service again, and the service key may be directly obtained from the security chip in the service server, thereby reducing a load of the key management service, preventing the key management service from crashing, and improving the reliability of an information system. The embodiments of this specification are dedicated to achieving a balance between the security of the key and the load of the key management service, and achieve the technical effects of reducing the load of the key management service and preventing the service key from being stolen by a hacker.

EMBODIMENT 2

Figure 3:
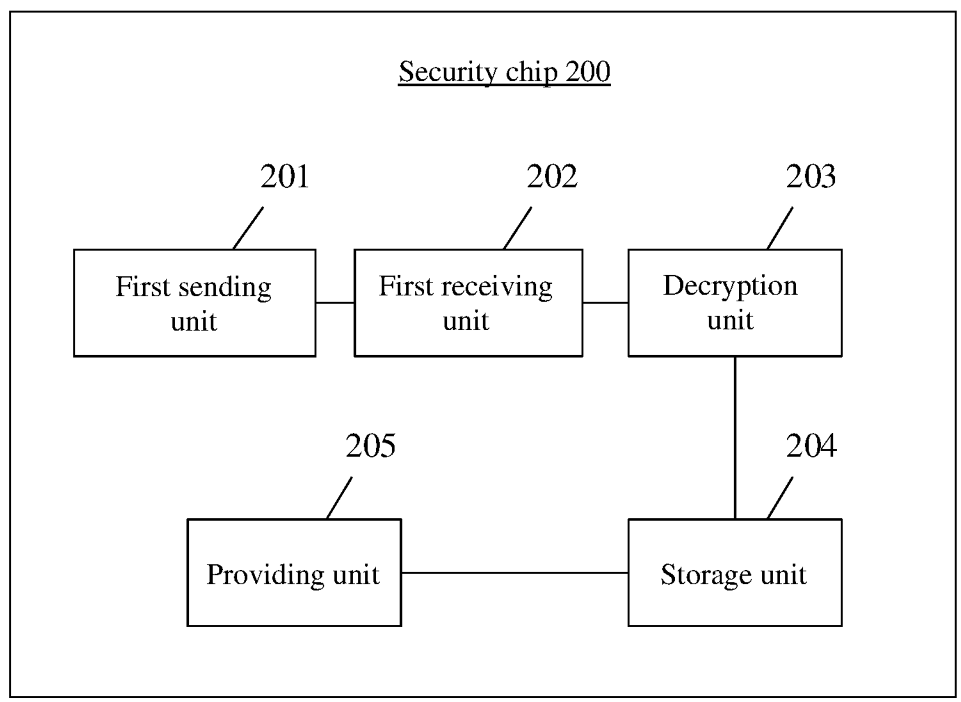
FIG. 3 is a schematic structural diagram of a security chip, according to an embodiment of this specification.

Based on the same inventive concept, this embodiment provides a security chip, applicable to a service server in an information system, where the information system further includes a key management service. As shown in FIG. 3, the security chip includes: a first sending unit 201, a first receiving unit 202, a decryption unit 203, a storage unit 204, and a providing unit 205.

The first sending unit 201 is configured to send a request to the key management service, where the request is used for obtaining a service key from the key management service.

The first receiving unit 202 is configured to receive a service key ciphertext sent by the key management service, where the service key ciphertext is obtained by encrypting the service key by the key management service based on a migration key.

The decryption unit 203 is configured to decrypt the service key ciphertext based on the migration key to obtain the service key.

The storage unit 204 is configured to store the service key in the security chip.

The providing unit 205 is configured to provide the service key to an application program on the service server when the application program needs to encrypt service data based on the service key.

In an embodiment, the security chip further includes: a second sending unit, configured to send a migration certificate to the key management service for authentication by the key management service before the request is sent to the key management service, where the migration certificate is stored in the security chip and is used for identity authentication of the security chip. The first sending unit sends the request to the key management service after the authentication of the migration certificate succeeds.

In an embodiment, the storage unit 204 is configured to: encrypt the service key based on a storage key, and store the encrypted service key, where storage keys corresponding to different security chips are different; or store the service key in a specific security space, where the specific security space is in the security chip.

In an embodiment, the providing unit 205 is configured to: receive to-be-encrypted service data sent by the application program, where the application program is installed on the service server corresponding to the security chip; encrypt the to-be-encrypted service data based on the service key; and send the encrypted service data to the application program.

In an embodiment, the providing unit 205 is configured to: send the service key to the application program for the application program to encrypt to-be-encrypted service data based on the service key, where the application program is installed on the service server corresponding to the security chip.

In an embodiment, the security chip further includes: an invalidation unit, configured to perform invalidation on the service key after a preset time period; and an updating unit, configured to resend a request to the key management service to obtain a new service key from the key management service after the invalidation is performed on the service key.

The security chip may be a specialized hardware chip that includes one or more microprocessors and one or more memories. The one or more memories of the security chip may store software modules and units as explained above that are executable by the one or more microprocessors of the security chip.

EMBODIMENT 3

Based on the same inventive concept, this embodiment provides a service server provided with the foregoing security chip(s) (that is, the security chip(s) in any implementation in Embodiment 2).

EMBODIMENT 4

Based on the same inventive concept, this embodiment provides an information system, as shown in FIG. 1, including: a key management service; and a plurality of service servers (such as a service server 1, a service server 2, a service server 3, . . . ), where each of these service servers is provided with a security chip (that is, the security chip(s) in any implementation in Embodiment 2).

EMBODIMENT 5

Based on the same inventive concept, this embodiment provides a non-transitory computer-readable storage medium, storing a computer program, which when the program is executed by a processor, causes the processor to perform operations including: sending a request to the key management service, where the request is used for obtaining a service key from the key management service; receiving a service key ciphertext sent by the key management service, where the service key ciphertext is obtained by encrypting the service key by the key management service based on a first migration key; decrypting the service key ciphertext based on a second migration key to obtain the service key, where the second migration key is stored in the security chip and corresponds to the first migration key; securely storing the service key; and performing invalidation on the service key after a preset time period.

In some embodiments, the steps of the method of Embodiment 1 as disclosed above may be performed when the program is executed by the processor.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

The embodiments of this specification are described with reference to the flowcharts and/or block diagrams of the method, the device (system), and the computer program product according to the embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Although preferable embodiments of this specification have been described, once a person skilled in the art learns the basic inventive concept, additional changes and modifications may be made to these embodiments. Therefore, the following claims are intended to be construed as to cover the preferable embodiments and all changes and modifications falling within the scope of the embodiments of this specification.

Apparently, a person skilled in the art may make various modifications and variations to the embodiments of this specification without departing from the spirit and scope of the embodiments of this specification. In this way, if the modifications and variations of the embodiments of this specification fall within the scope of the claims of the embodiments of this specification and equivalent technologies thereof, the embodiments of this specification also intend to include the modifications and variations.

What is claimed is:

1. A key management method, comprising:

sending, by a security chip of a computer device, a request for obtaining a service key to a key management service;

receiving, by the security chip, a service key ciphertext from the key management service, wherein the service key ciphertext is obtained by encrypting the service key by the key management service based on a migration key of the security chip;

decrypting, by the security chip, the service key ciphertext based on the migration key to obtain the service key;

storing, by the security chip, the service key in the security chip;

providing, by the security chip, the service key to an application program of the computer device when the application program needs to encrypt data based on the service key;

invalidating, by the security chip, the service key after a preset time period; and resending, by the security chip, a request for obtaining a new service key to the key management service to obtain the new service key from the key management service.

2. The method according to claim 1, wherein before the sending, by the security chip, a request for obtaining a service key to the key management service, the method further comprises:

sending, by the security chip, a migration certificate to the key management service, wherein the migration certificate is stored in the security chip and is configured for identity authentication of the security chip; and authenticating, by the key management service, the migration certificate.

3. The method according to claim 2, wherein the storing, by the security chip, the service key in the security chip comprises:

encrypting, by the security chip, the service key with a storage key to generate an encrypted service key, and storing the encrypted service key in the security chip, wherein storage keys corresponding to different security chips are different.

4. The method according to claim 2, wherein the storing, by the security chip, the service key in the security chip comprises:

storing, by the security chip, the service key in a secured space of the security chip.

5. The method according to claim 2, wherein the migration certificate comprises the migration key of the security chip, wherein the security chip provides the migration key to the key management service when the security chip sends the migration certificate to the key management service.

6. The method according to claim 1, wherein the providing, by the security chip, the service key to an application program of the computer device comprises:

receiving, by the security chip, service data sent by the application program; and encrypting, by the security chip, the service data with the service key to generate encrypted service data, and sending the encrypted service data to the application program.

7. The method according to claim 1, wherein the providing, by the security chip, the service key to an application program of the computer device comprises:

sending, by the security chip, the service key to the application program for the application program to encrypt service data with the service key.

8. A security chip disposed in a computer device, wherein the security chip comprises one or more microprocessors and one or more memories configured with instructions that, when executed by the one or more microprocessors, cause the security chip to perform operations comprising:

sending a request for obtaining a service key to a key management service;

receiving a service key ciphertext from the key management service, wherein the service key ciphertext is obtained by encrypting the service key by the key management service based on a migration key of the security chip;

decrypting the service key ciphertext based on the migration key to obtain the service key;

storing the service key in the security chip;

providing the service key to an application program of the computer device when the application program needs to encrypt data based on the service key;

invalidating the service key after a preset time period; and resending a request for obtaining a new service key to the key management service to obtain the new service key from the key management service.

9. The security chip according to claim 8, wherein the providing the service key to an application program of the computer device comprises:

receiving service data sent by the application program; and encrypting the service data with the service key to generate encrypted service data, and sending the encrypted service data to the application program.

10. The security chip according to claim 8, wherein the providing the service key to an application program of the computer device comprises:

sending the service key to the application program for the application program to encrypt service data with the service key.

11. A security chip disposed in a computer device, wherein the security chip comprises one or more microprocessors and one or more memories configured with instructions that, when executed by the one or more microprocessors, cause the security chip to perform operations comprising:

sending a request for obtaining a service key to a key management service;

receiving a service key ciphertext from the key management service, wherein the service key ciphertext is obtained by encrypting the service key by the key management service based on a migration key of the security chip;

decrypting the service key ciphertext based on the migration key to obtain the service key;

storing the service key in the security chip; and providing the service key to an application program of the computer device when the application program needs to encrypt data based on the service key, wherein before the sending a request for obtaining a service key to the key management service, the operations further comprise:

sending a migration certificate to the key management service, wherein the migration certificate is stored in the security chip and is configured for identity authentication of the security chip such that the key management service authenticates the migration certificate.

12. The security chip according to claim 11, wherein the storing the service key in the security chip comprises:

encrypting the service key with a storage key to generate an encrypted service key, and storing the encrypted service key in the security chip, wherein storage keys corresponding to different security chips are different.

13. The security chip according to claim 11, wherein the storing the service key in the security chip comprises:

storing the service key in a secured space of the security chip.

14. The security chip according to claim 11, wherein the migration certificate comprises the migration key of the security chip, wherein the security chip provides the migration key to the key management service when the security chip sends the migration certificate to the key management service.

15. A non-transitory computer-readable storage medium storing instructions executable by a security chip of a computer device to cause the security chip to perform operations comprising:

sending a request for obtaining a service key to a key management service;

receiving a service key ciphertext from the key management service, wherein the service key ciphertext is obtained by encrypting the service key by the key management service based on a migration key of the security chip;

decrypting the service key ciphertext based on the migration key to obtain the service key;

storing the service key in the security chip;

providing the service key to an application program of the computer device when the application program needs to encrypt data based on the service key;

invalidating the service key after a preset time period; and resending a request for obtaining a new service key to the key management service to obtain the new service key from the key management service.

16. The non-transitory computer-readable storage medium according to claim 15, wherein before the sending a request for obtaining a service key to the key management service, the operations further comprise:

sending a migration certificate to the key management service, wherein the migration certificate is stored in the security chip and is configured for identity authentication of the security chip such that the key management service authenticates the migration certificate.

17. The non-transitory computer-readable storage medium according to claim 16, wherein the storing the service key in the security chip comprises:

encrypting the service key with a storage key to generate an encrypted service key, and storing the encrypted service key in the security chip, wherein storage keys corresponding to different security chips are different; or storing the service key in a secured space of the security chip.

18. The non-transitory computer-readable storage medium according to claim 16, wherein the migration certificate comprises the migration key of the security chip, wherein the security chip provides the migration key to the key management service when the security chip sends the migration certificate to the key management service.

19. The non-transitory computer-readable storage medium according to claim 15, wherein the providing the service key to an application program of the computer device comprises:

receiving service data sent by the application program; and encrypting the service data with the service key to generate encrypted service data, and sending the encrypted service data to the application program.

20. The non-transitory computer-readable storage medium according to claim 15, wherein the providing the service key to an application program of the computer device comprises:

sending the service key to the application program for the application program to encrypt service data with the service key.

* * * * *